| United States Patent [19] | [11] Patent Number: 5,017,649 |
|---|---|
| Clemens | [45] Date of Patent: May 21, 1991 |

[54] LOW TEMPERATURE MICHAEL ADDITION REACTIONS

[75] Inventor: Robert J. Clemens, Kingsport, Tenn.

[73] Assignee: Eastman Kodak Company, Rochester, N.Y.

[21] Appl. No.: 144,996

[22] Filed: Jan. 19, 1988

[51] Int. Cl.⁵ .................. C08F 26/04; C08G 63/48; C08G 2/00; C08C 69/66

[52] U.S. Cl. .................. 525/59; 528/224; 528/315; 560/187

[58] Field of Search ............ 525/59; 528/224, 315; 560/187

[56] References Cited

U.S. PATENT DOCUMENTS

| 2,730,517 | 1/1956 | Vogel et al. | 260/75 |
|---|---|---|---|
| 4,217,439 | 8/1980 | Heckles | 528/220 |
| 4,218,515 | 8/1980 | Heckles | 428/474 |
| 4,408,018 | 10/1983 | Bartman et al. | 418/77 |
| 4,617,154 | 10/1986 | Green | 564/153 |
| 4,665,223 | 5/1987 | Green | 560/263 |

OTHER PUBLICATIONS

Julius Grant, Hackh's Chemical Dictionary, 4th edition, 1972, p. 428.
Astle and Shelton, Organic Chemistry, 2nd edition, 1959, p. 246.
Synthesis, pp. 44–45 (1972), "Tetramethylguanidine-Catalyzed Addition of Nitromethane to α,β-Unsaturated Carboxylic Acid Esters". Pollini et al.
Chemistry Letters, pp. 461–464 (1978). Mukaiyama et al.

*Primary Examiner*—Marion E. McCamish
*Assistant Examiner*—Susan Berman
*Attorney, Agent, or Firm*—J. Frederick Thomsen; William P. Heath, Jr.; S. E. Reiter

[57] ABSTRACT

The condensation of β-dicarbonyl compounds with α,β-unsaturated compounds is promoted by amidine and guanidine compounds.

18 Claims, No Drawings

LOW TEMPERATURE MICHAEL ADDITION REACTIONS

The invention relates to base promoted condensation reactions between β-dicarbonyl compounds and α,β-unsaturated compounds.

BACKGROUND

The coatings industry is continuallly in need of new coatings systems which will crosslink at moderate temperatures (15°-35° C.; 60°-95° F.) and avoid the use of toxic crosslinking reagents such as isocyanates. The Michael Reaction is a nucleophilic attack by an anion (the Michael donor) on an olefin which bears an electon withdrawing group (this olefin is known as the Michael acceptor). The anion is formed by the removal of an acidic proton from the Michael donor by a basic catalyst. The Michael reaction of acetoacetylated polymers with unsaturated polyesters provides a means of thermosetting these polymers at moderate temperatures. The Michael reaction of acetoacetylated polymers is an especially desirable mode of crosslinking because the final properties of the coating can be tailored to suit individual applications by appropriate selection of the backbone resin which bears the acetoacetyl group. In addition, the Michael reaction provides a desirable means to functionalize acetoacetic acid derivatives without causing the crosslinking of such moieites.

Conventional Michael catalysts, i.e., strong bases such as hydroxide and methoxide, suffer several serious drawbacks. Such strong bases are either insoluble or only marginally soluble in many coatings solvents, and may precipitate and thus cloud the coating as the solvent evaporates. Also, such strong bases may catalyze the Michael reaction too vigorously, which results in too short a pot life for the coatings system. These strong bases also tend to be sensitive to the type of solvent employed, which increases the problems associated with formulation.

Nitrogenous bases are not generally known to catalyze the Michael reaction at low temperatures. Indeed, U.S. Pat. No. 4,408,018 indicates that amine bases such as triethanolamine will not promote crosslinking of acetoacetylated thermoplastic materials into thermoset resins.

STATEMENT OF THE INVENTION

In accordance with the present invention, I have discovered that amidine and guanidine bases readily catalyze the Michael reaction, at temperatures as low as about 0° C., between β-dicarbonyl compounds such as acetoacetic acid derivatives and α,β-unsaturated compounds such as acrylates.

The invention process can be employed to promote crosslinking of a variety of acetoacetylated polymers with polyacrylates; to promote crosslinking of acryloylated polymers with polyacetoacetates; and for functionalizing various acetoacetic acid derivatives. The invention process requires that one employ only small amounts of the amidine and guanidine base catalysts, and provides surprisingly rapid Michael addition reactions.

DETAILED DESCRIPTION OF THE INVENTION

In accordance with the present invention, there is provided a process for the alkylation of β-dicarbonyl compounds having the structural formula:

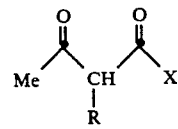

wherein
R is selected from the group consisting of H, hydrocarbyl moieties, and substituted hydrocarbyl moieties; with the proviso that no R-group (or portion of an R group) is sufficiently acidic to neutralize the base catalyst employed for said alkylation; and
X is selected from the group consisting of OR, NR$_2$, CR$_3$, aromatic or substituted aromatic moieties having 6 to 10 carbon atoms, and polymeric moieties with
an α,β-unsaturated compound having the structural formula:

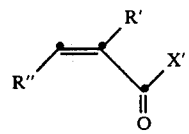

wherein
R' is H, methyl, CN, acetyl, or —CO$_2$R;
wherein
R is as defined above;
R" is selected from the group consisting of H, methyl, methoxy, ethoxy, and —CO$_2$R; wherein R is as defined above; and
X' is selected from the group consisting of OR, NR$_2$ and CR$_3$, wherein R is as defined above; C$_1$-C$_{20}$ alkyl or substituted alkyl; C$_6$-C$_{10}$ aryl or substituted aryl; and a polymeric moiety with the proviso that no group R', R", X or X' is sufficiently acidic to neutralize the base catalyst employed for said alkylation;
said process comprising contacting said β-dicarbonyl compound and said α,β-unsaturated compound in the presence of at least one base selected from the group consisting of compounds having the structural formula:

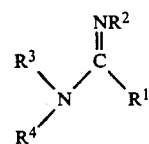

wherein
R$^1$=C$_1$-C$_{20}$ alkyl, aryl, aralkyl or alkaryl moiety;
R$^2$, R$^3$ and R$^4$ are each independently selected from H, C$_1$-C$_{20}$ alkyl or aralkyl, wherein any two or more of R$^1$, R$^2$, R$^3$ and R$^4$ can be interconnected as part of a ring structure; and

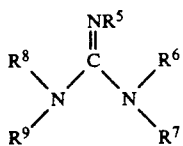

wherein each of $R^5-R^9$ are independently selected from H, $C_1-C_{20}$ alkyl or aralkyl, wherein any two or more of $R^5-R^9$ can be interconnected as part of a ring structure.

The suitability of a given amidine or guanidine base will be determined by its basicity (i.e., pKb; it should be greater than or equal to about 12) and the solubility of that compound. For conventional, organic solvent based chemistry, N-alkylated amidines and guanidines would be preferred for their basicity, enhanced solubility, and the stability of the free base. The compounds contemplated for use in the practice of the present invention are represented by the following general formula:

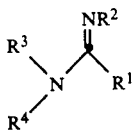

$R^1 = C_{1-20}$ alkyl, aryl, aralkyl or alkaryl, $R^2$, $R^3$ and $R^4$ are each independently H, $C_{1-20}$ alkyl or aralkyl; wherein any two or more of $R^1$, $R^2$, $R^3$ and $R^4$ can be interconnected.

Preferably only 0 or 1 of the groups $R^2$, $R^3$ or $R^4$ will be H.

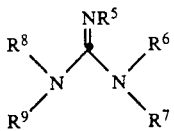

wherein each of $R^5-R^9$ is independently selected from H, $C_{1-20}$ alkyl or aralkyl; wherein any two or more of $R^5-R^9$ may be interconnected as part of a ring structure. Preferably, no more than 3 of $R^5-R^9$ will be H.

The commercially available and relatively inexpensive tetramethylguanidine (TMG) is the preferred guanidine, while 1,8-diazabicyclo[5.4.0]undec-7-ene (DBU) and 1,5-diazabicyclo[4,3,0]non-5-ene (DBN) are the preferred amidines.

Water soluble systems are also contemplated for use with these catalysts; in such systems it would be desirable for more of the R groups to be H.

β-Dicarbonyl compounds useful in the practice of the present invention are represented by the following structural formula:

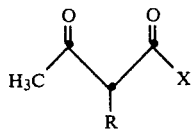

R is H, hydrocarbyl or substituted hydrocarbyl; with the proviso that R not contain acidic functionality which would neutralize the catalyst; and X=OR, $NR_2$, $CR_3$, $C_{6-10}$ aromatic or substituted aromatic and polymeric moieties. In a preferred embodiment, R is H or the residue from a prior Michael addition reaction.

Low molecular weight acetoacetic acid derivatives are readily prepared by processes well known by those of skill in the art, such as reaction of nucleophiles (e.g., alcohols, amines, and the like) with diketene or the diketene acetone adduct; or by transesterification of esters with acetoacetate esters such as ethyl acetoacetate. The acetoacetylated polymers are readily obtained empolying procedures well known by those of skill in the art, which generally include using some portion of an acetoacetylated monomer (e.g., AAEM: acetoacetoxyethyl methacrylate) in a polymerization reaction or acetoacetylating a preformed polymer with diketene, methyl acetoacetate, or another acetoacetylating reagent. General procedures which would furnish a variety of acetoacetylated polymers are available in the chemical literature (e.g., Chem. Reviews 86, 244-318 (1986)), and several specific preparations are provided in the examples which follow. The source of the acetoacetyl groups is not critical. Acetoacetamides will also react in the Michael reaction, if (a) there are no free hydrogen atoms on the N, or (b) the proton on N is not sufficiently acidic to neutralize the basic catalyst.

Preferred β-dicarbonyl compounds are acetoacetic acid derivatives, with exemplary compounds being:
isobutyl acetoacetate,
acetoacetoxyethyl methacrylate containing copolymers,
trans-1,4-cyclohexanedimethanol bis-acetoacetate,
glycerol triacetoacetate,
neopentyl glycol bisacetoacetate,
ethylene glycol bisacetoacetate,
trimethylolpropane tris-acetoacetate,
pentaerythritol tetrakis-acetoacetate,
acetoacetylated polyvinyl alcohols,
acetoacetylated polyester resins, and mixtures of any two or more thereof.

α,β-Unsaturated compounds contemplated for use in the practice of the present invention are represented by the following structural formula:

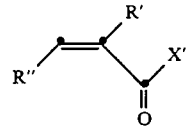

R'=H, methyl, CN, acetyl or —$CO_2R$; wherein R is as defined above;

R"=H, $CH_3$, methoxy, ethoxy, or $CO_2R$; wherein R is as defined above; and

X'=OR, $NR_2$, $CR_3$, where R is as defined and may contain other substituents or be polymeric; $C_1-C_{20}$ alkyl or substituted alkyl; $C_6-C_{10}$ aryl or substituted aryl; or a polymeric moiety.

The (Michael) acceptor can contain one or more α,β-unsaturated esters. If this portion of the system contains two or more unsaturated esters, it will generally be regarded as the crosslinking agent, and would normally be selected from such commercially available materials as ethylene glycol diacrylate, trimethylolpropane triacrylate (TMPTA), etc. Methacrylate, crotonate, and other unsaturated esters such as maleates and fumarates can replace the acrylate esters, but they are less preferred as they tend to be less reactive.

It should, of course, be recognized that an acryloylated polymer could be prepared, thus making the polymer the acceptor portion of the system, and then reacted with a polyfunctional donor molecular such as glycerol trisacetoacetate (the crosslinking reagent) to provide a Michael-crosslinked coating system which is effectively the reverse of the systems described above. Such a "reverse" system is described in the Examples which follow. If crosslinking is desired, a minimum requirement is that each donor and acceptor molecule must be at least bifunctional (with respect to the acetoacetyl moiety or the unsaturated ester). Thus, in a simple example, the Michael reaction could be used to form a thermoset material from ethylene glycol bis-acetoacetate and glycerol tris-acetoacetate, while on the other extreme it could be used to crosslink an acetoacetylated high polymer with another high polymer which bears unsaturated ester functionality.

The use of solvent and/or diluent in the practice of the present invention is optional. When employed, a wide range of non acidic solvents are suitable, such as, for example, ethers (e.g., tetrahydrofuran (THF)), aromatic hydrocarbons (e.g., toluene and xylene), alcohols (e.g., n-butanol), esters (e.g., ethyl 3-ethoxypropionate, available from the Eastman Chemicals Division of the Eastman Kodak Co. as Ektapro ® EEP Solvent), and the like. A wide range of solvents can be used in the practice of the present invention because the invention process (as demonstrated in Example I, below) is relatively insensitive to solvent, unlike many other prior art Michael addition reactions. When solvent (or diluent) is employed, loading levels can range from as low as about 10 up to 80 wt. % and higher (of $\beta$-dicarbonyl compound plus $\alpha,\beta$-unsaturated compound in said diluent).

The invention process can be carried out over a wide range of temperatures. A particular advantage of the invention process is ability to obtain convenient reaction rates at moderate temperatures in the range of about 0° up to 70° C. Preferably, reaction temperatures in the range of about 10° up to 40° C. will be employed.

Where the invention process is employed for the preparation of a thermoset coating, it is sometimes desirable to subject the coating to a second, higher temperature, treatment. For such purpose, temperatures in the range of about 40° up to 120° C. are suitable.

The ratio of equivalents of $\alpha,\beta$-unsaturated moiety to $\beta$-dicarbonyl moiety employed in the practice of the present invention can vary widely. In general, the higher the ratio of $\alpha,\beta$-unsaturated moiety to $\beta$-dicarbonyl moiety, the faster the reaction rate.

The amount of amidine and/or guanidine catalyst employed in the practice of the present invention can vary widely. In general, the higher the catalyst concentration, the faster the reaction rate. Catalyst concentrations in the range of about 0.5 up to 20 mol %, relative to the $\beta$-dicarbonyl moiety, are generally suitable. Preferred catalyst concentrations fall in the range of about 1 up to 10 mol %.

Reaction times employed in the practice of the present invention can vary widely, depending on such factors as the reaction temperature, the basicity of the catalyst, the ratio of $\alpha,\beta$-unsaturated moiety to $\beta$-dicarbonyl moiety, the presence or absence of diluent (solvent), and the like. When the invention process is carried out to functionalize the $\beta$-dicarbonyl compound, faster reaction rates are preferred, in order to minimize the time during which reactor space is required, and to minimize the possibility of side reactions occurring. When the invention process is employed in a coating application, controlled cure rates in the range of about 4 up to 24 hours are desirable to make possible a defined pot life (i.e., time prior to gellation) for the coating formulations. Composition pot life in the range of about 6 up to 12 hours is preferred for spray on coatings applications for a combination of handling convenience (i.e., ease of spray application) while still allowing a reasonable drying time once spray application is complete.

The invention will now be described in greater detail by reference to the following non-limiting examples.

EXAMPLES

Two procedures were used to evaluate the process of the present invention. The catalysts were compared for relative activity by measuring the rate at which a given catalyst system would promote the Michael reaction between isobutyl acetoacetate and ethyl acrylate. The concentrations of the various reagents in these kinetic studies were selected to closely approximate the concentrations of acetoacetate and acrylate groups which would be present in actual coatings formulations. The evaluation of the capability of a given catalyst to promote crosslinking was done by preparing formulations containing a multi-functional appropriate solvent and then measuring gel time of the solution and dry-to-touch times on a drawdown. This latter test served to better approximate the behavior of actual coatings formulations and also established that predictions based on the first screening test could be legitimately extended to predicting the ability of a given catalyst to work in actual coatings systems.

EXAMPLE 1

Model System for Comparison of Catalysts

The Model System typical procedure: A stock solution of isobutyl acetoacetate (7.9 g, 0.05 mol), ethyl acrylate (5.41 mL, 0.05 mol) and 0.5 g of p-dichlorobenzene (internal standard) was diluted to 50.00 mL with tetrahydrofuran. A 10.00 mL volumetric flask was filled with a portion of this solution and immersed in a Haake constant temperature bath maintained at 25.0°±0.1° C. Tetramethylguanidine (5 mole %, 0.063 mL) was added to the thermally equilibrated solution and the flask was agitated. Reaction aliquots (0.5 mL) were removed at T=0, and then at 30-60 minute intervals for the next 8 hours; these aliquots were added to a vial which contained 2.00 mL of diethyl ether and 0.200 mL of 0.1 N HCl, and the vials were thoroughly shaken and the phases allowed to separate. A portion of the ethereal layer was transferred to a sample vial for GC analysis. Control experiments established that the extraction procedure completely quenched the Michael reaction and that the relative amounts of the reactants (except the catalyst), the products, and the internal standard were unchanged by the extraction procedure. The samples were then autoinjected (HP7673A) onto a 30 m DB-5 capillary column in an HP5890 gas chromatograph (injector 220° C.; oven 70° C. for 2 minutes, then ±20° C./minute to 240° C.) equipped with a flame ionization detector. Each sample was injected twice, and the integrated values of the peak size versus the internal standard were averaged. The log (ethyl acrylate) was plotted as a function of time to calculate a pseudo-first order rate constant in sec$^{-1}$.

TABLE I

5 Mole % Catalyst
Pseudo-First Order Rate Constants
($k \times 10^5$ sec$^{-1}$)

| Catalyst* | Solvent** | | | |
|---|---|---|---|---|
| | THF | Xylene | n-Butanol | EEP |
| Comparison: | | | | |
| KOH | 29 | insol. | 20 | |
| TBAH | 30 | 10.5 | 6.3 | |
| TEA | <0.1 | | | |
| Invention: | | | | |
| TMG | 5.8 | 5.0 | 7.7 | 8.3 |
| DBU | 2.8 | 2.7 | 3.7 | |
| DBN | 29 | | | |

*KOH = Potassium hydroxide
TBAH = Tetrabutylammonium hydroxide
TEA = Triethylamine
TMG = Tetramethyl guanidine
DBU = 1,8 Diazabicyclo[5.4.0]undecene
DBN = 1,5 Diazabicyclo[4.3.0]nonene
**THF = Tetrahydrofuran
EEP = Ethyl 3-ethoxypropionate The results of Table I demonstrate that the invention process is relatively insensitive to changes in solvent, while prior art Michael reaction catalysts show a greater variability in reactivity depending on the solvent employed. The rate constants presented above can be used to predict the relative reactivities of the different catalysts for a given set of reagents.

TABLE II

Effect of Catalyst Concentrations on
the Rate of Michael Reactions
in THF at 25° C.

| Catalyst* | Concentration, mol %** | Rate ($\times 10^5$ sec$^{-1}$) |
|---|---|---|
| TBAH | 5 | 30 |
| | 2 | 4.6 |
| TMG | 10 | 21 |
| | 8 | 7 |
| | 5 | 5.8 |
| | 4 | 4.4 |
| | 2 | 1.0 |
| | 1 | 0.5 |
| DBU | 5 | 2.8 |
| | 2 | 0.1 |
| DBN | 5 | 29 |
| | 2 | 2.7 |

*TBAH = Tetrabutylammonium hydroxide
TMG = Tetramethylguanidine
DBU = 1,8 Diazabicyclo[5.4.0]undecene
DBN = 1,5 Diazabicyclo[4.3.0]nonene
**Concentration of base catalyst in mol %, based on the moles of acetoacetate moiety The results of Table II demonstrate that the invention process is capable of achieving reaction rates comparable to those achieved with prior art catalysts (i.e., TBAH). In addition, it is seen that the reaction rate can be controlled by varying the concentration of base which is employed.

EXAMPLE 2

Preparation of Thermoset Materials

The purpose of these gel experiments was to conclusively establish that amidine and guanidine catalysts will promote crosslinking via the Michael Reaction at ambient temperatures. An acetoacetylated polymer and a stoichiometric quantity (based on individual functional groups) of trimethylolpropane triacrylate (TMPTA) were dissolved in either ethyl 3-ethoxypropionate (Ektapro ® EEP) or 50/50 n-butanol/xylene at the specified concentration (typically 33% solids). Aliquots (10 mL) of these stock solutions were pipetted into 15 mL vials, a catalyst was added (typically 5 mole % relative to acetoacetyl groups), and the vials were repeatedly inverted until they gelled. A visible viscosity increase was generally noted only very shortly before the gel point.

A. Sample Coating System Based on Acrylates

A copolymer of either 10 or 20 mole percent acetoacetoxyethyl acrylate (AAEM) and methyl methacrylate was prepared by established radical polymerization techniques in ethyl 3-ethoxypropionate (EEP) solvent. The polymeric solutions were then adjusted to 60% solids and were used as described above. See Table III for comparisons.

B. Sample Coatings System Based on Polyesters

Acetoacetylation of a Polyester Resin

An aliphatic polyester resin (350 g, mw 6000) bearing excess hydroxyl groups (mw 400 per hydroxyl group) (prepared from dimethyl cyclohexane dicarboxylic adic, neopentyl glycol, trimethylol propane, and isophthalic acid) was added to 250 mL of ethyl acetate, heated to 60° C. to effect dissolution and then cooled to 45° C. Dimethylaminopyridine (DMAP, 45 mg, 400 ppm) was added, followed by the dropwise addition of enough diketene (62.4 mL) to acetoacetylate 90% of the free hydroxyl groups; the rate of addition was adjusted so that the reaction temperature never exceeded 55° C. The solvent was removed in vacuo 1 hour after the diketene addition was completed, to afford a virtually quantitative yield (413 g) of the acetoacetylated polymer which had a Gardner color of 1. This polymer was then used as described above.

Trans-1,4-cyclohexanedimethanol (CHDM) bis-acetoacetate (CHDM AcAc$_2$) was prepared by literature procedures, as described in Clemens, R. J.; Hyatt, J. A., J. Org. Chem., 1985, 50, 2431-2435.

C. Sample Coatings System Based on Cellulosics

A sample of cellulose triacetoacetate (Cell AcAc$_3$) was prepared by established literature procedures and used as described above. The resulting white amorphous solid was dissolved in acetone and used as described above.

D. "Reverse" Approach to Coatings via Michael Reactions

A 39.5 g sample of cellulose acetate butyrate CAB was acylated with 100 mmol of acryloyl chloride to afford an amorphous solid with an effective molecular weight of 400/acryoyl group. This material was dissolved in acetone, glycerol trisacetoacetate was added as the crosslinking reagent (instead of TMPTA), and the gel tests were run as described above.

TABLE III

Preparation of Thermoset Coatings
Based on the Michael Reaction

| Run - Resins* | Concn. of AcAc Groups | Catalyst** (mol % relative to acetoacetate) | | Solvent | Absolute Gel Time (Hours) |
|---|---|---|---|---|---|
| B - Polyester | .8M | KOH | 1 | nBuOH/xyl | 1 |
| | | TMG | 5 | " | 1 |
| | | TMG | 2 | " | 17 |
| | | TMG | 1 | " | no gel |
| | | DBU | 5 | " | 1 |
| B - CHDM | .50M | TMG | 10 | " | 6 |

TABLE III-continued

Preparation of Thermoset Coatings Based on the Michael Reaction

| Run - Resins* | Concn. of AcAc Groups | Catalyst** (mol % relative to acetoacetate) | | Solvent | Absolute Gel Time (Hours) |
|---|---|---|---|---|---|
| AcAc$_2$ | | | | | |
| A - 10% AAEM | .27M | TMG | 5 | " | 25 |
| | .21M | TMG | 10 | acetone | 1 |
| A - 20% AAEM | .25M | TMG | 5 | " | 6 |
| | | TBAH | 5 | " | 4 |
| | | DBN | 5 | " | 3 |
| | | DBU | 5 | " | 22 |
| C - Cell | .33M | TMG | 5 | acetone | 2 |
| AcAc$_3$ | .10M | TMG | 5 | " | 1 |
| ***Reverse | .25M | TMG | 5 | " | 2 |
| Approach | .20M | TMG | 10 | EEP | 1 |

*Runs refer to variations A-D described in the text.
**KOH = Potassium hydroxide
TBAH = Tetrabutylammonium hydroxide
TMG = Tetramethyl guanidine
DBU = 1,8 Diazabicyclo[5.4.0]undecene
DBN = 1,5 Diazabicyclo[4.3.0]nonene
***Acryloylated cellulosic crosslinking with glycerol tris acetoacetate The results set forth in Table III demonstrate that the invention reaction is quite general. It is shown that invention reaction can be applied for the formation of coatings (thermoset polymers) from several different types of acetoacetylated materials.

EXAMPLE 3

Michael Addition with Other Acrylates

The Michael reactions of isobutyl acetoacetate with several other activated olefins (Michael acceptors) were examined via the model system described above to demonstrate reactivity of amidine and/or guanidine base catalysts with the following α,β-unsaturated esters: ethyl acrylate, diethyl maleate, methyl methacrylate, and ethyl crotonate.

The invention has been described in detail with particular references to preferred embodiments thereof, but it will be understood that variations and modifications can be effected within the spirit and scope of the invention.

I claim:

1. A process for the alkylation of β-dicarbonyl compounds having the structure formula:

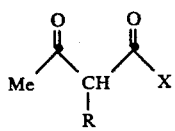

wherein R is selected from the group consisting of H, hydrocarbyl moieties, and substituted hydrocarbyl moieties; with the proviso that no R-group is sufficiently acidic to neutralize the base catalyst employed for said alkylation; and X is selected from the group consisting of OR, NR$_2$, CR$_3$, aromatic or substituted aromatic moieties having 6 to 10 carbon atoms, and polymeric moieties with an α,β-unsaturated compound having the structural formula:

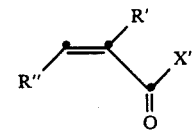

wherein R' is H, methyl, CN acetyl, or —CO$_2$R;
wherein R is as defined above;
R" is selected from the group consisting of H, methyl, methoxy, ethoxy, and —CO$_2$R; wherein R is as defined above; and
X' is selected from the group consisting of OR, NR$_2$ and CR$_3$; wherein R is as defined above; C$_1$–C$_{20}$ alkyl or substituted alkyl; C$_6$–C$_{10}$ aryl or substituted aryl; and a polymeric moiety with the proviso that no group R', R", X or X' is sufficiently acidic to neutralize the base catalyst employed for said alkylation;

said process comprising contacting said β-dicarbonyl compound and said α,β-unsaturated compound in the presence of at least one base selected from the group consisting of compounds having the structural formula:

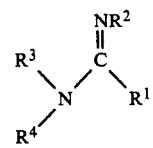

wherein R$^1$=C$_1$–C$_{20}$ alkyl, aryl, aralkyl or alkaryl moiety;
R$^2$, R$^3$ and R$^4$ are each independently selected from H, C$_1$–C$_{20}$ alkyl or aralkyl, wherein any two or more of R$^1$,
R$^2$, R$^3$ and R$^4$ can be interconnected as part of a ring structure; and

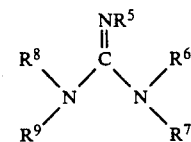

wherein each of R$^5$–R$^9$ are independently selected from
H, C$_1$–C$_{20}$ alkyl or aralkyl, wherein any two or more of R$^5$–R$^9$ can be interconnected as part of a ring structure wherein said contacting results in crosslinking of a thermoset material comprising said β-dicarbonyl compound and said α,β-unsaturated compound and wherein said thermoset material is first applied to a substrate and subjected to a preliminary curing at a temperature in the range of 10°–40° C., followed by a second curing treatment at a temperature in the range of 40°–120° C.

2. The process of claim 1 wherein said base is 1,8-diazabicyclo [5.4.0]undec-7-ene (DBU) or 1,5-diazabicyclo [4.3.0]non-5-ene (DBN), as well as mixtures thereof.

3. The process of claim 1 wherein said base is tetramethylguanidine (TMG).

4. The process of claim 1 wherein said base is selected from the group consisting of:
DBU, DBN, and
TMG
as well as mixtures of any two or more thereof.

5. The process of claim 1 wherein said β-dicarbonyl compound is an acetoacetic acid derivative having the structural formula:

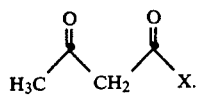

6. The process of claim 5 wherein said acetoacetic acid derivative is selected from the group consisting of:
isobutyl acetoacetate,
acetoacetoxyethyl methacrylate-containing copolymers,
cyclohexanedimethanol bis-acetoacetate,
glycerol triacetoacetate,
neopentyl glycol bisacetoacetate,
ethylene glycol bisacetoacetate,
trimethylolpropane tris-acetoacetate,
pentaerythritol tetrakis-acetoacetate,
acetoacetylated polyvinyl alcohols,
acetoacetylated polyester resins,
and mixtures of any two or more thereof.

7. The process of claim 1 wherein said α,β-unsaturated compound is selected from the group consisting of:
ethylene glycol diacrylate,
trimethylolpropane triacrylate,
alkyl maleates,
alkyl fumarates,
alkyl methacrylates,
alkyl crotonates,
acryloylated polymeric materials,
unsaturated resins derived from maleate or fumarate moieties,
as well as mixtures of any two or more thereof.

8. The process of claim 1 wherein the ratio of dicarbonyl functional groups to α,β-unsaturated functional groups falls within the range of about 0.1 up to 10 equivalents of α,β-unsaturated functional groups per equivalent of β-dicarbonyl functional groups.

9. The process of claim 8 wherein about 0.005 up to 0.2 equivalents of said base are employed per equivalent of said β-dicarbonyl functional groups.

10. The process of claim 1 wherein said contacting is carried out at a temperature in the range of about 0° up to 70° C.

11. The process of claim 1 wherein said contacting is carried out at a temperature in the range of about 10° up to 40° C.

12. The process of claim 1 wherein a nonacidic organic diluent is employed as the reaction medium for the contacting of said β-dicarbonyl compound and said α,β-unsaturated compound.

13. The process of claim 12 wherein the wt. % of β-dicarbonyl compound and said α,β-unsaturated compound in said diluent falls within the range of about 10% up to 80%.

14. The process of claim 1 wherein said β-dicarbonyl compound is part of a polymeric moiety.

15. The process of claim 14 wherein said α,β-unsaturated compound is part of a polymeric moiety.

16. The process of claim 1 wherein said α,β-unsaturated compound is part of a polymeric moiety.

17. The process of claim 1 wherein said thermoset material comprises a monomeric polyfunctional β-dicarbonyl compound and a monomeric polyfunctional α,β-unsaturated compound.

18. The process of claim 1 wherein the gellation of said thermoset material occurs in the range of about 4 up to 24 hours.

* * * * *